(12) United States Patent
Maruoka et al.

(10) Patent No.: US 9,484,058 B2
(45) Date of Patent: Nov. 1, 2016

(54) SPINDLE MOTOR AND DISK DRIVE APPARATUS

(71) Applicant: Nidec Corporation, Kyoto (JP)

(72) Inventors: Seiji Maruoka, Kyoto (JP); Hironori Ando, Kyoto (JP); Yuki Tajima, Kyoto (JP); Takahiro Hisada, Kyoto (JP); Yoshitsugu Sasaguri, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 0 days.

(21) Appl. No.: 14/963,297

(22) Filed: Dec. 9, 2015

(65) Prior Publication Data

US 2016/0293204 A1 Oct. 6, 2016

(30) Foreign Application Priority Data

Mar. 31, 2015 (JP) ................................ 2015-074562

(51) Int. Cl.
*F16C 17/00* (2006.01)
*G11B 19/20* (2006.01)
*F16C 17/10* (2006.01)
*F16C 33/10* (2006.01)

(52) U.S. Cl.
CPC ........... *G11B 19/2009* (2013.01); *F16C 17/10* (2013.01); *F16C 17/102* (2013.01); *F16C 17/107* (2013.01); *F16C 33/106* (2013.01); *F16C 33/107* (2013.01); *F16C 33/1065* (2013.01)

(58) Field of Classification Search
None
See application file for complete search history.

(56) References Cited

U.S. PATENT DOCUMENTS

| 7,088,023 B1 * | 8/2006 | Gomyo | F16C 35/02 310/40 R |
|---|---|---|---|
| 2002/0060501 A1 | 5/2002 | Rafaelof | |
| 2007/0086686 A1 * | 4/2007 | Ishikawa | F16C 17/026 384/100 |
| 2010/0181875 A1 * | 7/2010 | Tamaoka | G11B 19/2009 310/425 |
| 2014/0226238 A1 | 8/2014 | Ikeda et al. | |

FOREIGN PATENT DOCUMENTS

| KR | 10-2012-0127960 A | 11/2012 |
| KR | 10-2013-0069013 A | 6/2013 |
| KR | 10-2014-0003753 A | 1/2014 |
| KR | 10-2014-0056646 A | 5/2014 |

* cited by examiner

*Primary Examiner* — Carlos E Garcia
(74) *Attorney, Agent, or Firm* — Keating & Bennett, LLP

(57) ABSTRACT

A spindle motor includes a fixing portion defined by a bearing portion, a holder portion, a gap between the bearing portion and the holder portion, and an adhesive arranged in the gap. The fixing portion includes first and second protruding surfaces arranged to protrude radially from a first and a second one, respectively, of an outside surface of the bearing portion and an inside surface of the holder portion; and first and second boundary surfaces arranged to join the first and second surfaces, respectively, to the first and second protruding surfaces, respectively. At least a portion of the first boundary surface is arranged above the second boundary surface. The first and second protruding surfaces are arranged radially opposite to the second and first surfaces, respectively, with a first and a second gap, respectively, intervening therebetween. The first boundary surface is arranged opposite to the second boundary surface with a third gap intervening therebetween. The adhesive is arranged to extend from the third gap to at least a portion of each of the first and second gaps.

16 Claims, 13 Drawing Sheets

SPINDLE MOTOR AND DISK DRIVE APPARATUS

BACKGROUND OF THE INVENTION

1. Field of the Invention

The present invention relates to a spindle motor and a disk drive apparatus.

2. Description of the Related Art

Spindle motors arranged to rotate disks about central axes thereof are typically installed in hard disk apparatuses, optical disk apparatuses, and the like. Such a spindle motor includes a stationary portion fixed to a housing of the apparatus, and a rotating portion arranged to rotate while holding the disk(s). The spindle motor is arranged to produce a torque acting in a rotation direction centered on the central axis by magnetic flux generated between the stationary and rotating portions, whereby the rotating portion and the disk(s) held by the rotating portion are caused to rotate with respect to the stationary portion.

The stationary and rotating portions of the spindle motor are joined to each other such that the rotating portion is rotatable relative to the stationary portion through a bearing unit. The bearing unit includes a bearing member (e.g., a sleeve) included in the stationary portion, and a bearing member (e.g., a shaft) included in the rotating portion. The bearing member included in the stationary portion is, for example, inserted inside a tubular holder portion extending in an axial direction and defined in a base member of the stationary portion, and is fixed to the holder portion through an adhesive.

When such a known spindle motor is assembled, the adhesive is first applied to an inner circumferential surface of the holder portion of the base member, and the bearing unit is thereafter inserted inside the holder portion, for example. This method, however, may allow the bearing unit to scrape off the adhesive when the bearing unit is inserted inside the holder portion, resulting in a reduction in a strength with which the bearing unit and the holder portion are adhered to each other.

SUMMARY OF THE INVENTION

A spindle motor according to a preferred embodiment of the present invention includes a rotor portion including a rotor magnet; a bearing portion arranged to support the rotor portion such that the rotor portion is rotatable about a central axis extending in a vertical direction of the rotor portion; a stator portion arranged opposite to the rotor magnet; a base portion including a tubular holder portion arranged to hold the bearing portion inside thereof; and a fixing portion defined by the bearing portion, the holder portion, a gap between the bearing portion and the holder portion, and an adhesive arranged in the gap. The gap is arranged to extend in an annular shape in a circumferential direction. The fixing portion includes an annular first protruding surface arranged to protrude radially from a first one of an outside surface of the bearing portion and an inside surface of the holder portion, and an annular second protruding surface arranged to protrude radially from a second one of the outside surface of the bearing portion and the inside surface of the holder portion; a first boundary surface arranged below the first protruding surface, and arranged to join the first surface and the first protruding surface to each other; and a second boundary surface arranged above the second protruding surface, and arranged to join the second surface and the second protruding surface to each other. At least a portion of the first boundary surface is arranged above the second boundary surface. The first protruding surface is arranged radially opposite to the second surface with a first gap intervening therebetween. The second protruding surface is arranged radially opposite to the first surface with a second gap intervening therebetween. The first boundary surface is arranged opposite to the second boundary surface with a third gap intervening therebetween. The adhesive is arranged to extend from the third gap to both at least a portion of the first gap and at least a portion of the second gap.

A disk drive apparatus according to another preferred embodiment of the present invention includes the spindle motor according to the above preferred embodiment of the present invention; a disk supported by the spindle motor; and an access portion arranged to perform at least one of reading and writing of information from or to the disk.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Hereinafter, spindle motors and disk drive apparatuses according to preferred embodiments of the present invention will be described with reference to FIGS. 1 to 13.

It is assumed herein that a direction along a central axis A is a vertical direction, and that a side on which a rotating portion 4 is arranged and a side on which a stationary portion 3 is arranged in relation to each other are defined as an upper side and a lower side, respectively. The shape of each member or portion and relative positions of different members or portions will be described based on the above assumptions. It should be noted, however, that the above definitions of the vertical direction and the upper and lower sides are made simply for the sake of convenience in description, and should not be construed to restrict in any way the orientation of a spindle motor or a disk drive apparatus according to any preferred embodiment of the present invention actually installed in a device.

Figure 1:
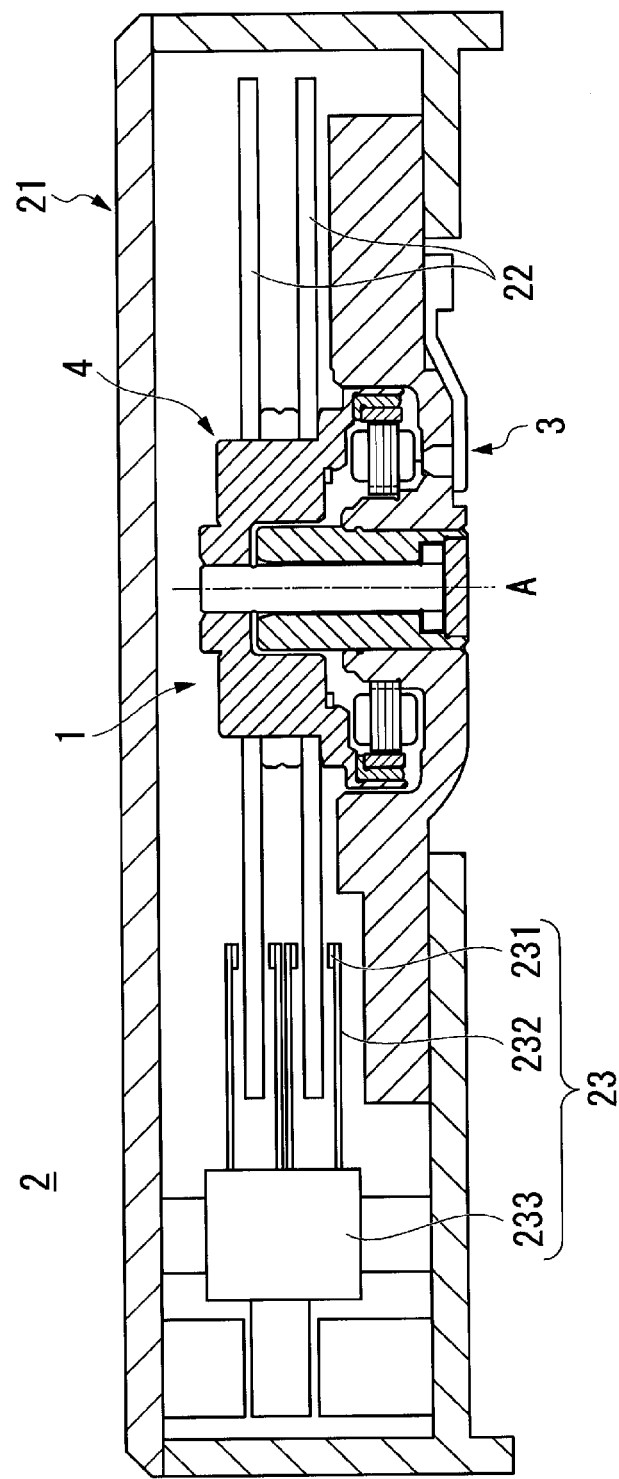
FIG. 1 is a vertical cross-sectional view of a disk drive apparatus 2 according to a preferred embodiment of the present invention.

FIG. 1 is a vertical cross-sectional view of a disk drive apparatus 2 according to a preferred embodiment of the present invention. The disk drive apparatus 2 is a hard disk apparatus arranged to rotate two magnetic disks 22 and perform at least one of reading and writing of information from or to the magnetic disks 22. Referring to FIG. 1, the disk drive apparatus 2 includes, as primary components, an apparatus housing 21, the two magnetic disks (hereinafter simply referred to as the "disks") 22, an access portion 23, and a spindle motor 1. The access portion 23 includes an actuator mechanism 233, four arms 232, and four head portions 231, and uses the actuator mechanism 233 to move the four arms 232 along the disks 22, and thus causes any of the four head portions 231 to make an access to a desired position on a corresponding one of the disks 22 to perform at least one of the reading and the writing of information on a recording surface of the rotating disk 22.

Figure 2:
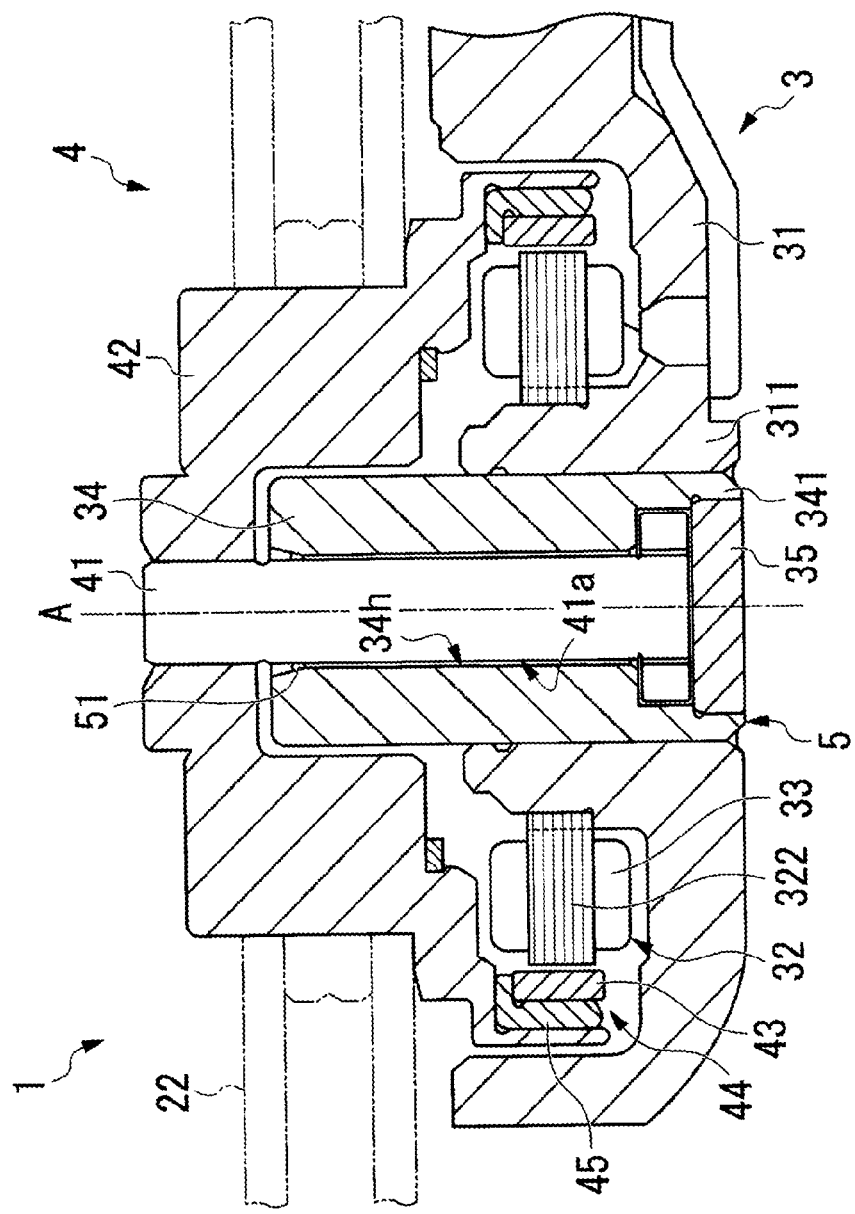
FIG. 2 is a vertical cross-sectional view of a spindle motor 1 according to the above preferred embodiment of the present invention.

The structure of the spindle motor 1 described above will now be described in detail below. FIG. 2 is a vertical cross-sectional view of the spindle motor 1. Referring to FIG. 2, the spindle motor 1 includes a stationary portion 3 fixed to the apparatus housing 21 of the disk drive apparatus 2, and a rotating portion 4 arranged to rotate about a central axis A while holding the disks 22.

The stationary portion 3 includes, as primary components, a base portion 31, a stator portion 32, coils 33, and a bearing unit 5. The base portion 31 is fixed to the apparatus housing 21 (see FIG. 1), and is preferably made of a metallic material, such as, for example, aluminum. The base portion 31 includes a tubular holder portion 311 arranged to project in an axial direction around the central axis A. Note that the terms "axial direction", "axial", and "axially" as used herein refer to a direction along the central axis A. The stator portion 32 is attached to a radially outside surface of the holder portion 311. Note that the terms "radial direction", "radial", and "radially" as used herein refer to directions perpendicular to the central axis A. The stator portion 32 includes a plurality of tooth portions 322 arranged to project radially outward. A conducting wire is wound around each of the tooth portions 322 to define the coil 33. A flexible circuit board is attached to a lower surface of the base portion 31. Conducting wires drawn from the coils 33 are passed through through holes defined in the base portion 31, and are electrically connected to the flexible circuit board.

The bearing unit 5 is arranged to join the stationary portion 3 and the rotating portion 4 to each other such that the rotating portion 4 is rotatable about the central axis A relative to the stationary portion 3. The bearing unit 5 includes a substantially cylindrical bearing portion 34. The bearing portion 34 is arranged radially outside of a shaft 41. That is, the bearing portion 34 includes a bearing hole through which the shaft 41 is inserted. The bearing portion 34 is preferably made of a metallic material, such as, for example, stainless steel. The bearing portion 34 is inserted inside the holder portion 311 of the base portion 31 from above the holder portion 311. The bearing portion 34 is fixed to the holder portion 311 through a fixing portion F, which will be described in detail below. A protruding portion 341, which is arranged to protrude downward from an end of an outer circumferential portion of the bearing portion 34, is arranged at a lower surface of the bearing portion 34. The protruding portion 341 is arranged to have a substantially annular external shape when viewed in the axial direction. A cap 35 is fixed inside of the protruding portion 341. That is, the cap 35 is arranged to close a lower end opening of the bearing portion 34.

The cap 35 is made of, for example, a metallic material, such as stainless steel or aluminum, or a resin material. A minute gap is defined between an inner circumferential surface 34h of the bearing portion 34 and an outer circumferential surface 41a of the shaft 41. A minute gap is also defined between a lower surface of the shaft 41 and an upper surface of the cap 35. A lubricating oil 51 is arranged continuously in these minute gaps. Each of these minute gaps is preferably arranged to have a width of, for example, about several micrometers.

The rotating portion 4 includes, as primary components, the shaft 41, a hub 42, and a rotor portion 44. The shaft 41 is arranged to extend along the central axis A. The shaft 41 is inserted into the bearing hole of the bearing portion 34, and is rotatably supported by the bearing portion 34 through the lubricating oil 51.

The hub 42 is substantially cylindrical, and includes a cover portion. The hub 42 includes a mounting surface on which the disks 22 are mounted. The shaft 41 is inserted through and fixed in a through hole of the cover portion. The hub 42 is arranged to rotate about the central axis A together with the shaft 41. A metallic material, such as, for example, aluminum or a magnetic stainless steel (SUS), is preferably used as a material of the hub 42. The hub 42 is arranged above the base portion 31 to cover an upper side of the stator portion 32, the coils 33, and the bearing portion 34.

The rotor portion 44 includes a back iron 45 and a rotor magnet 43 supported by the back iron 45. The back iron 45 is substantially cylindrical, and is attached to an inside surface of the hub 42. The rotor magnet 43 is annular, is arranged around the central axis A, and is attached to the hub 42 through the back iron 45. An inner circumferential surface of the rotor magnet 43 is a pole surface in which north and south poles alternate with each other. The inner circumferential surface of the rotor magnet 43 is arranged radially opposite to an outer circumferential surface of each of the tooth portions 322.

Once electric drive currents run through the coils 33 of the stationary portion 3 of the spindle motor 1, radial magnetic flux is generated in the tooth portions 322. Interaction between the magnetic flux of the tooth portions 322 and magnetic flux of the rotor magnet 43 produces a circumferential torque, so that the rotating portion 4 is caused to rotate about the central axis A with respect to the stationary portion 3. The two disks 22, which are held by the hub 42, are caused to rotate about the central axis A together with the shaft 41 and the hub 42.

Figure 3:
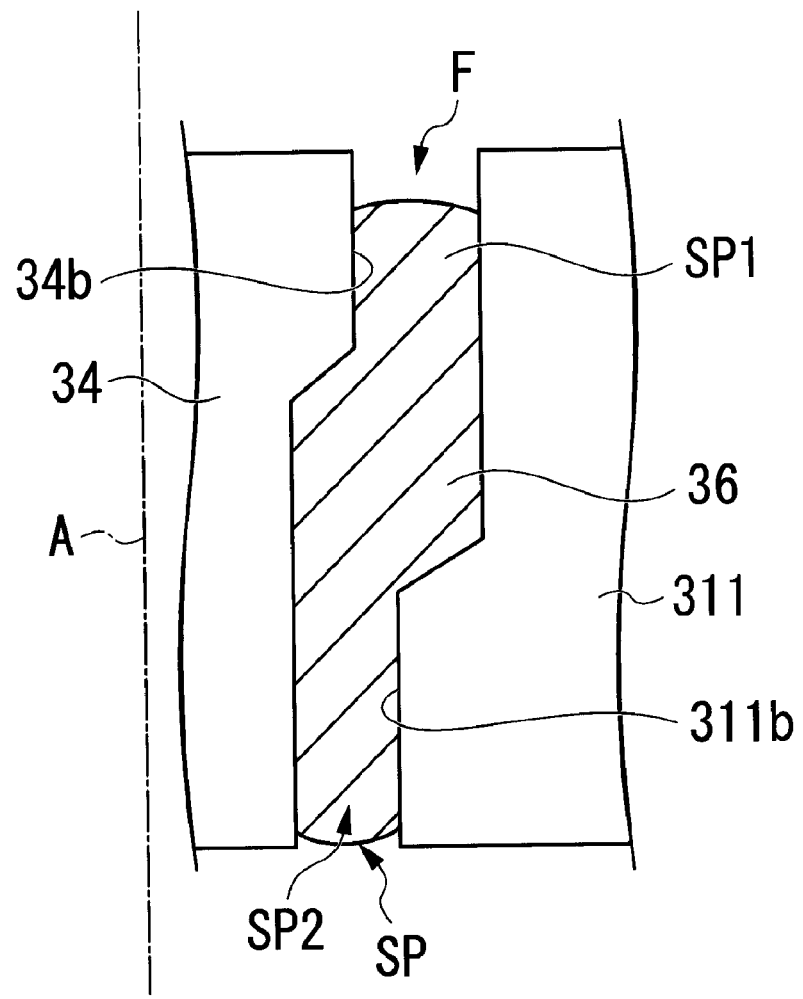
FIG. 3 is a schematic cross-sectional view illustrating a bearing portion 34 and a holder portion 311 fixed to each other through a fixing portion F including an adhesive 36, according to the above preferred embodiment of the present invention.
Figure 4:
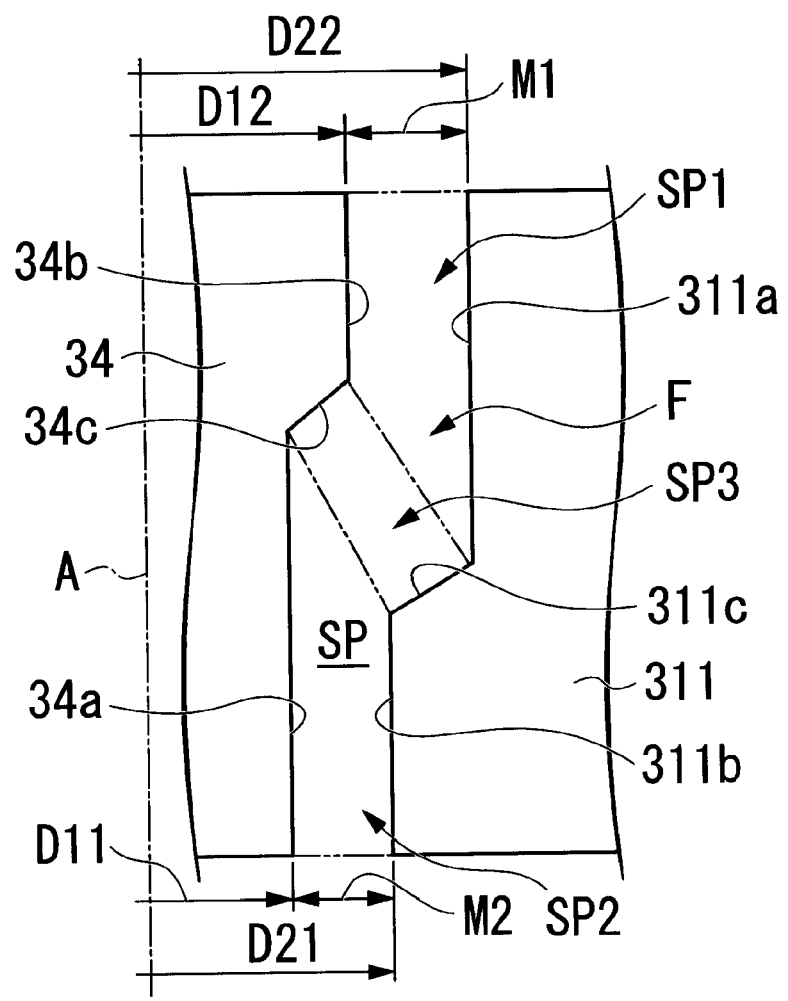
FIG. 4 is a cross-sectional view substantially identical to the cross-sectional view of FIG. 3 except that the adhesive 36 of the fixing portion F is not shown.

FIG. 3 is a schematic cross-sectional view illustrating the bearing portion 34 and the holder portion 311 fixed to each other through the fixing portion F, which includes an adhesive 36. FIG. 4 is a cross-sectional view substantially identical to the cross-sectional view of FIG. 3 except that the adhesive 36 of the fixing portion F is not shown.

A gap SP is defined by the bearing portion 34 and the holder portion 311. The fixing portion F includes the gap SP and the adhesive 36 arranged in the gap SP. The gap SP is arranged to extend in an annular shape in a circumferential direction about the central axis A.

The bearing portion 34 includes an outside surface 34a, a first protruding surface 34b, and a first boundary surface 34c. The first protruding surface 34b is annular, and is arranged to protrude radially outward from the outside surface 34a. The first boundary surface 34c is arranged below the first protruding surface 34b, and is arranged to join the outside surface 34a and the first protruding surface 34b to each other. The first protruding surface 34b provided in the bearing portion 34 contributes to reducing the degree of an inclination of the bearing portion 34 with respect to the central axis A if such an inclination occurs.

①The holder portion 311 includes an inside surface 311a, a second protruding surface 311b, and a second boundary surface 311c. ②The second protruding surface 311b is annular, and is arranged to protrude radially inward from the inside surface 311a. ③The second boundary surface 311c is arranged above the second protruding surface 311b, and is arranged to join the inside surface 311a and the second protruding surface 311b to each other. ④The first protruding surface 34b protrudes radially outward from the outside surface 34a, which corresponds to a first one of the outside surface 34a and the inside surface 311a. ⑤The second protruding surface 311b protrudes radially inward from the inside surface 311a, which corresponds to a second one of the outside surface 34a and the inside surface 311a.

At least a portion of the first boundary surface 34c is arranged above the second boundary surface 311c. The first protruding surface 34b is arranged radially opposite to the inside surface 311a with a first gap SP1 intervening therebetween. The second protruding surface 311b is arranged radially opposite to the outside surface 34a with a second gap SP2 intervening therebetween. The first boundary surface 34c is arranged opposite to the second boundary surface 311c with a third gap SP3 intervening therebetween. Note that, when two objects, e.g., surfaces, are described herein as being "opposite to" each other, the two objects may not necessarily be parallel to each other.

A maximum diameter D11 of the outside surface 34a, a maximum diameter D12 of the first protruding surface 34b, a minimum diameter D22 of the inside surface 311a, a minimum diameter D21 of the second protruding surface 311b satisfy the following relationship: D11<D12<D21<D22. That is, the maximum diameter D12 of the first protruding surface 34b of the bearing portion 34 is smaller than the minimum diameter D21 of the second protruding surface 311b of the holder portion 311. Accordingly, both the width of a gap between the outside surface 34a of the bearing portion 34 and the inside surface 311a of the holder portion 311 and the width of a gap between the first protruding surface 34b and the inside surface 311a are great enough to improve workability when the bearing portion 34 is inserted inside the holder portion 311. A gap width M1 of the first gap SP1 and a gap width M2 of the second gap SP2 satisfy the following relationship: M2<M1.

The fixing portion F is defined by the bearing portion 34, the holder portion 311, the gap SP between the bearing portion 34 and the holder portion 311, and the adhesive 36 arranged in the gap SP. That is, the fixing portion F is surrounded by the outside surface 34a, the first protruding surface 34b, the first boundary surface 34c, the inside surface 311a, the second protruding surface 311b, and the second boundary surface 311c. The adhesive 36 is arranged in the gap SP, which includes the first gap SP1, the second gap SP2, and the third gap SP3. The adhesive 36 is arranged to extend from the third gap SP3 to at least a portion of the first gap SP1, and from the third gap SP3 to at least a portion of the second gap SP2.

①According to this preferred embodiment, an anaerobic adhesive, for example, is used as the adhesive 36. ②Note that a thermosetting resin or a photo-curable resin may alternatively be used as the adhesive 36. ③The adhesive 36 may or may not possess electrical conductivity. ④To achieve a high adhesive strength, a nonconductive adhesive used for bonding purposes is preferably used. ⑤In the present preferred embodiment, in addition to the adhesive 36, which is used to fix the bearing portion 34 and the holder portion 311 to each other, an electrically conductive adhesive may be additionally arranged between the inside surface 311a of the holder 311 and the outside surface 34a of the bearing portion 34 to prevent the bearing portion 34 from becoming electrically charged. ⑥The electrically conductive adhesive is an adhesive including an electrically conductive material.

Figure 5:
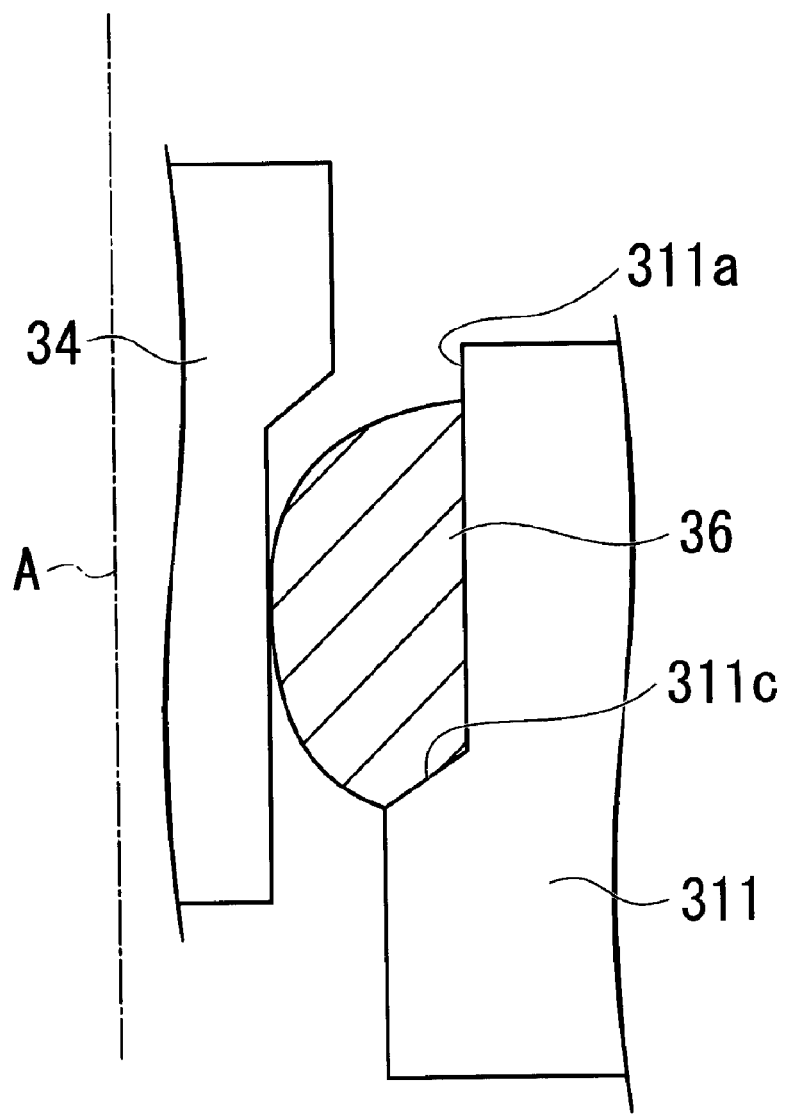
FIG. 5 is a diagram for explaining a method of fixing the bearing portion 34 and the holder portion 311 to each other according to the above preferred embodiment of the present invention.
Figure 6:
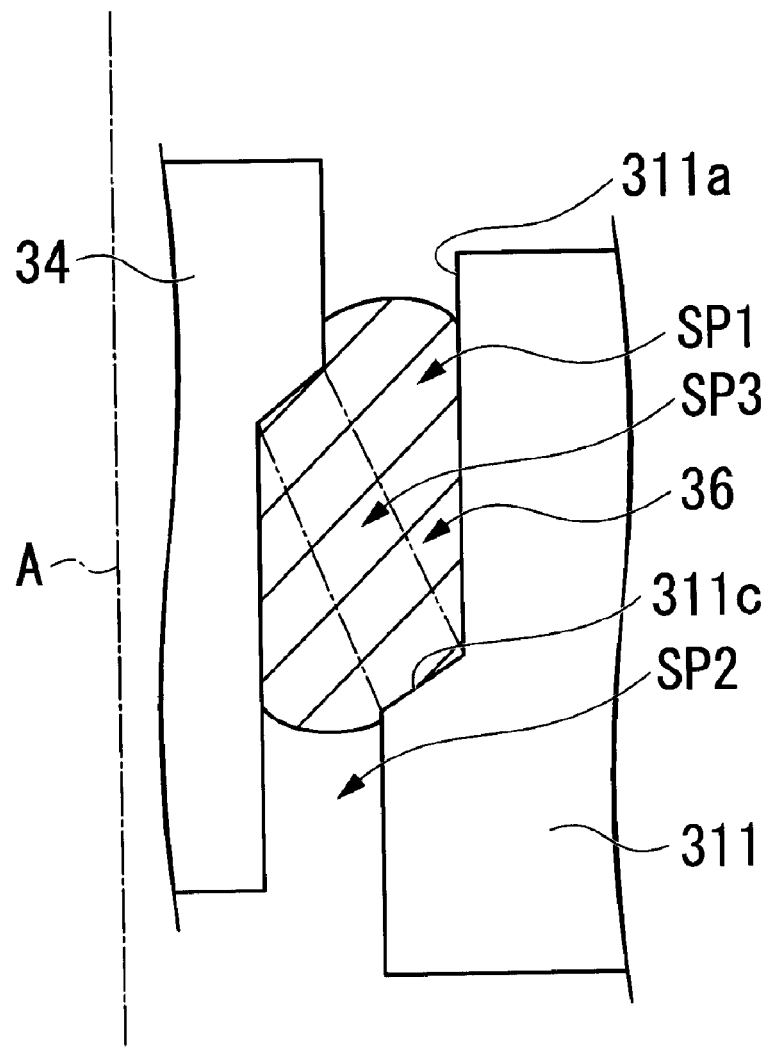
FIG. 6 is a diagram for explaining the method of fixing the bearing portion 34 and the holder portion 311 to each other according to the above preferred embodiment of the present invention.

A method of fixing the bearing portion 34 and the holder portion 311 to each other will now be described below. Referring to FIG. 5, the adhesive 36 is applied onto the second boundary surface 311c of the holder portion 311, and the bearing portion 34 is thereafter inserted inside the holder portion 311 from above the holder portion 311. As the insertion of the bearing portion 34 advances deeper into the holder portion 311 (i.e., downward in FIG. 5), the volume of the third gap SP3 gradually decreases. Once the volume of the third gap SP3 becomes smaller than the volume of the adhesive 36, the adhesive spreads into the first gap SP1 and the second gap SP2 as illustrated in FIG. 6.

The gap width M1 of the first gap SP1 is greater than the gap width M2 of the second gap SP2, and the first gap SP1 therefore has a lower flow resistance than the second gap SP2. Thus, a greater amount of adhesive 36 spreads into the first gap SP1 than into the second gap SP2. Therefore, the amount of the adhesive 36 held in the first gap SP1 is greater than the amount of the adhesive 36 held in the second gap SP2. As the volume of the third gap SP3 decreases with the advance of the insertion of the bearing portion 34 into the holder portion 311, the adhesive spreads from the third gap SP3 into the first gap SP1 and into the second gap SP2 as illustrated in FIG. 3. The adhesive 36 spreads from the third gap SP3 to at least a portion of the first protruding surface 34b and to at least a portion of the second protruding surface 311b. That is, the adhesive 36 is arranged in each of the first gap SP1, the second gap SP2, and the third gap SP3. A lower surface of the adhesive 36 is located at a lower opening of the second gap SP2. An upper surface of the adhesive 36 is located in the first gap SP1. Thus, a leakage of the adhesive 36 out of the gap SP is prevented. The adhesive is cured, so that the bearing portion 34 and the holder portion 311 are fixed to each other through the adhesive 36.

As described above, in the present preferred embodiment, when the bearing portion 34 is inserted inside the holder portion 311 from above the holder portion 311, the adhesive 36 is not scraped off downward, and the bearing portion 34 and the holder portion 311 are adhered to each other with a high strength through the adhesive 36, which has spread from the third gap SP3 to at least a portion of the first gap SP1 and to at least a portion of the second gap SP2. In addition, according to the present preferred embodiment, the gap width M1 of the first gap SP1 is greater than the gap width M2 of the second gap SP2. This allows the adhesive 36 to be supplied to the first gap SP1, which is located above the third gap SP3. Thus, in the disk drive apparatus 2 according to the present preferred embodiment, the bearing portion 34 is adhered to the holder portion 311 with a high adhesive strength.

Note that the adhesive 36 may not necessarily be arranged to extend in the entire gap SP, which extends in the annular shape in the circumferential direction, and may be absent in a portion of the gap SP.

Figure 7:
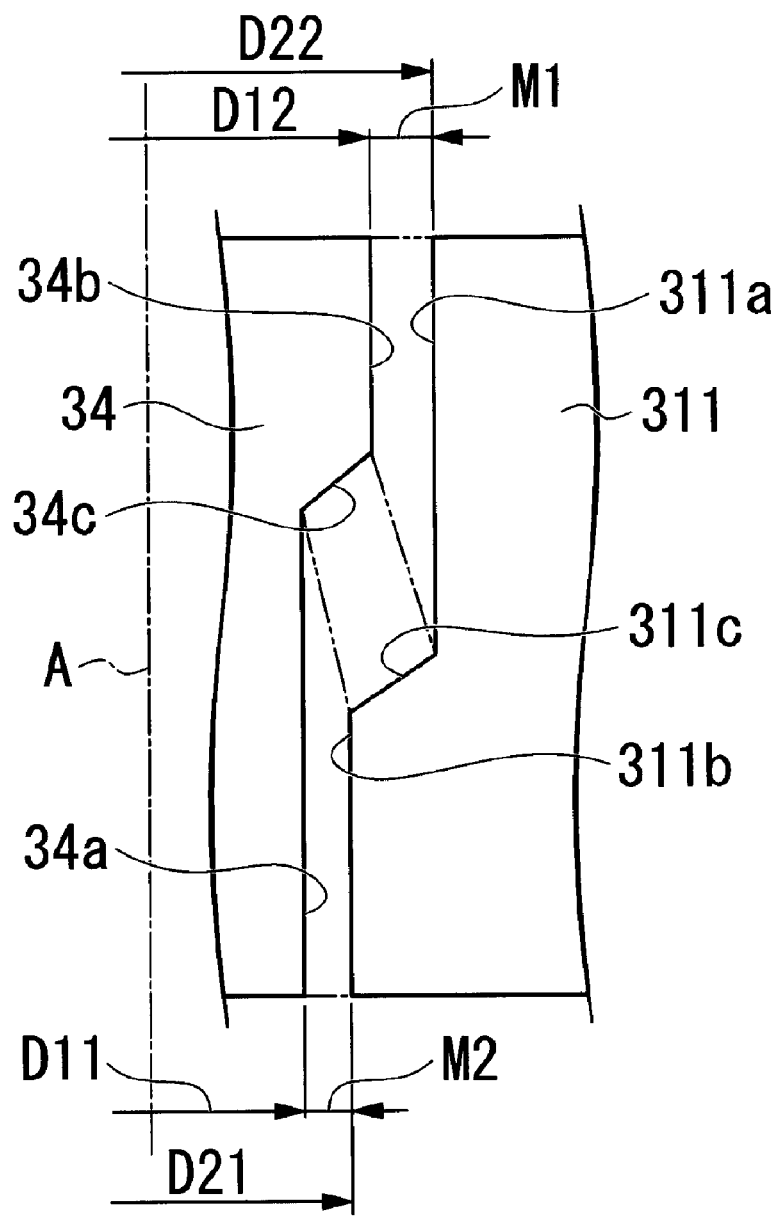
FIG. 7 is a diagram illustrating a spindle motor 1 according to a first modification of the above preferred embodiment of the present invention.

FIG. 7 is a schematic cross-sectional view illustrating a bearing portion 34 and a holder portion 311 of a spindle motor 1 according to a first modification of the above-described preferred embodiment. In FIG. 7, members or portions that have their equivalents in the above-described preferred embodiment illustrated in FIGS. 1 to 6 are denoted by the same reference numerals as those of their equivalents in the above-described preferred embodiment, and descriptions of those members or portions are omitted.

Referring to FIG. 7, a maximum diameter D12 of a first protruding surface 34b of the bearing portion 34 is greater than a minimum diameter D21 of a second protruding surface 311b of the holder portion 311. A first boundary surface 34c of the bearing portion 34 and a second boundary surface 311c of the holder portion 311 are arranged to overlap with each other when viewed in a direction parallel to a central axis A. The spindle motor 1 according to the first modification illustrated in FIG. 7 is otherwise identical in structure to the spindle motor 1 according to the above-described preferred embodiment, and descriptions of such identical features are omitted.

In the spindle motor 1 according to the first modification, a gap width M1 of a first gap SP1 is relatively small. This allows an adhesive 36 arranged in a third gap SP3 to spread more effectively into the first gap SP1. In addition, in the spindle motor 1 according to the first modification, the first boundary surface 34c and the second boundary surface 311c overlap with each other when viewed in the direction parallel to the central axis A. This allows the adhesive 36 arranged in the third gap SP3 to be effectively compressed to spread into the first gap SP1 and into a second gap SP2 when the bearing portion is inserted into the holder portion 311 in the direction parallel to the central axis A.

Figure 8:
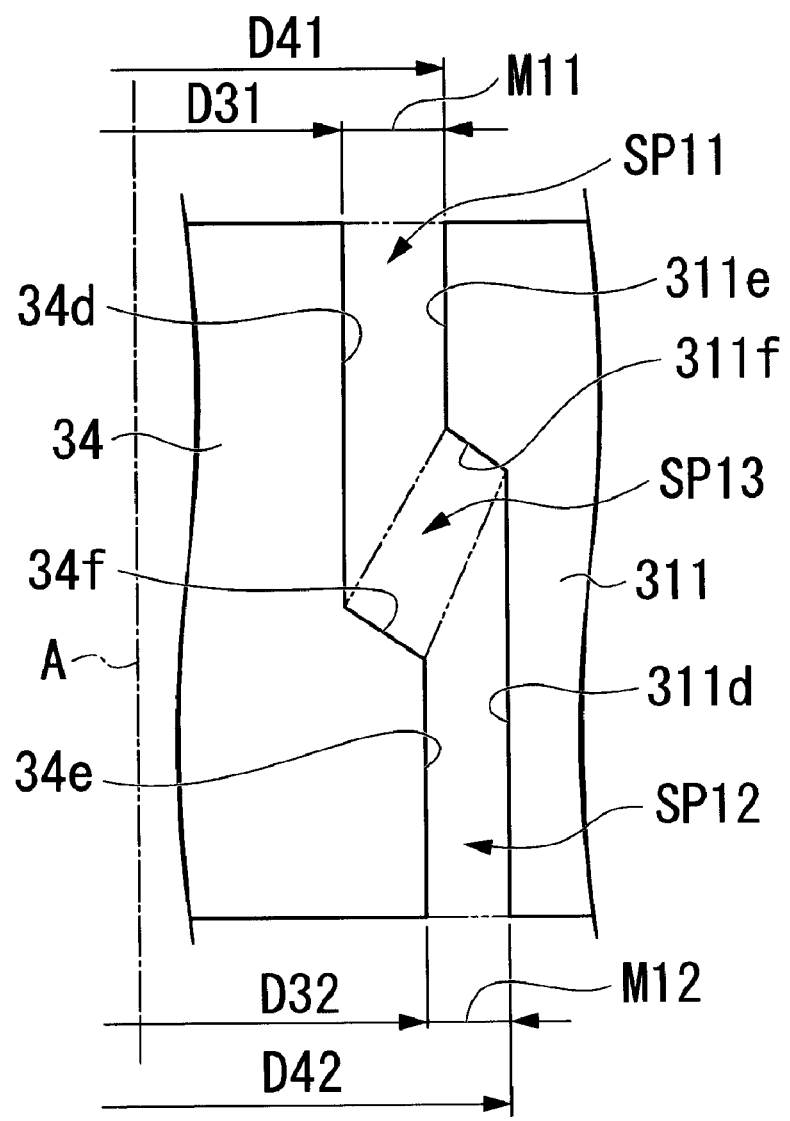
FIG. 8 is a diagram illustrating a spindle motor 1 according to a second modification of the above preferred embodiment of the present invention.

FIG. 8 is a schematic cross-sectional view illustrating a bearing portion 34 and a holder portion 311 of a spindle motor 1 according to a second modification of the above-described preferred embodiment. In FIG. 8, members or portions that have their equivalents in the above-described preferred embodiment illustrated in FIGS. 1 to 6 are denoted by the same reference numerals as those of their equivalents in the above-described preferred embodiment, and descriptions of those members or portions are omitted.

① Referring to FIG. 8, the bearing portion 34 and the holder portion 311 are structured in such a manner that they are turned upside down compared to the bearing portion 34 and the holder portion 311 according to the above-described preferred embodiment. ② That is, the bearing portion 34 according to the second modification illustrated in FIG. 8 is inserted inside the holder portion 311 from below the holder portion 311. ③ The holder portion 311 includes an inside surface 311d, a first protruding surface 311e, and a first boundary surface 311f. ④ The first protruding surface 311e is annular, and is arranged to protrude radially inward from the inside surface 311d. ⑤ The first boundary surface 311f is arranged below the first protruding surface 311e, and is arranged to join the inside surface 311d and the first protruding surface 311e to each other.

The bearing portion 34 includes an outside surface 34d, a second protruding surface 34e, and a second boundary surface 34f. The second protruding surface 34e is annular, and is arranged to protrude radially outward from the outside surface 34d. The second boundary surface 34f is arranged above the second protruding surface 34e, and is arranged to join the outside surface 34d and the second protruding surface 34e to each other. That is, the first protruding surface 311e protrudes radially inward from the inside surface 311d, which corresponds to a first one of the outside surface 34d and the inside surface 311d. The second protruding surface 34e protrudes radially outward from the outside surface 34d, which corresponds to a second one of the outside surface 34d and the inside surface 311d.

The first boundary surface 311f is arranged above the second boundary surface 34f. The first protruding surface 311e is arranged radially opposite to the outside surface 34d with a first gap SP11 intervening therebetween. The second protruding surface 34e is arranged radially opposite to the inside surface 311d with a second gap SP12 intervening therebetween. The first boundary surface 311f is arranged opposite to the second boundary surface 34f with a third gap SP13 intervening therebetween. Note that, when two objects, e.g., surfaces, are described herein as being "opposite to" each other, the two objects may not necessarily be parallel to each other.

A maximum diameter D31 of the outside surface 34d, a maximum diameter D32 of the second protruding surface 34e, a minimum diameter D42 of the inside surface 311d, and a minimum diameter D41 of the first protruding surface 311e satisfy the following relationship: D31<D32<D41<D42. A gap width M11 of the first gap SP11 is greater than a gap width M12 of the second gap SP12. That is, the gap width M11 of the first gap SP11 and the gap width M12 of the second gap SP12 satisfy the following relationship: M12<M11.

Thus, when the bearing portion 34 is inserted inside the holder portion 311 from below the holder portion 311, an adhesive 36 spreads from the third gap SP13 to both at least a portion of the first gap SP11 and at least a portion of the second gap SP12 without being scraped off upward. This allows the bearing portion 34 and the holder portion 311 to be adhered to each other with a high strength. In addition, in the present modification, the gap width M11 of the first gap SP11 is greater than the gap width M12 of the second gap SP12. This allows the adhesive 36 to be supplied to the first gap SP11, which is located above the third gap SP13.

Figure 9:
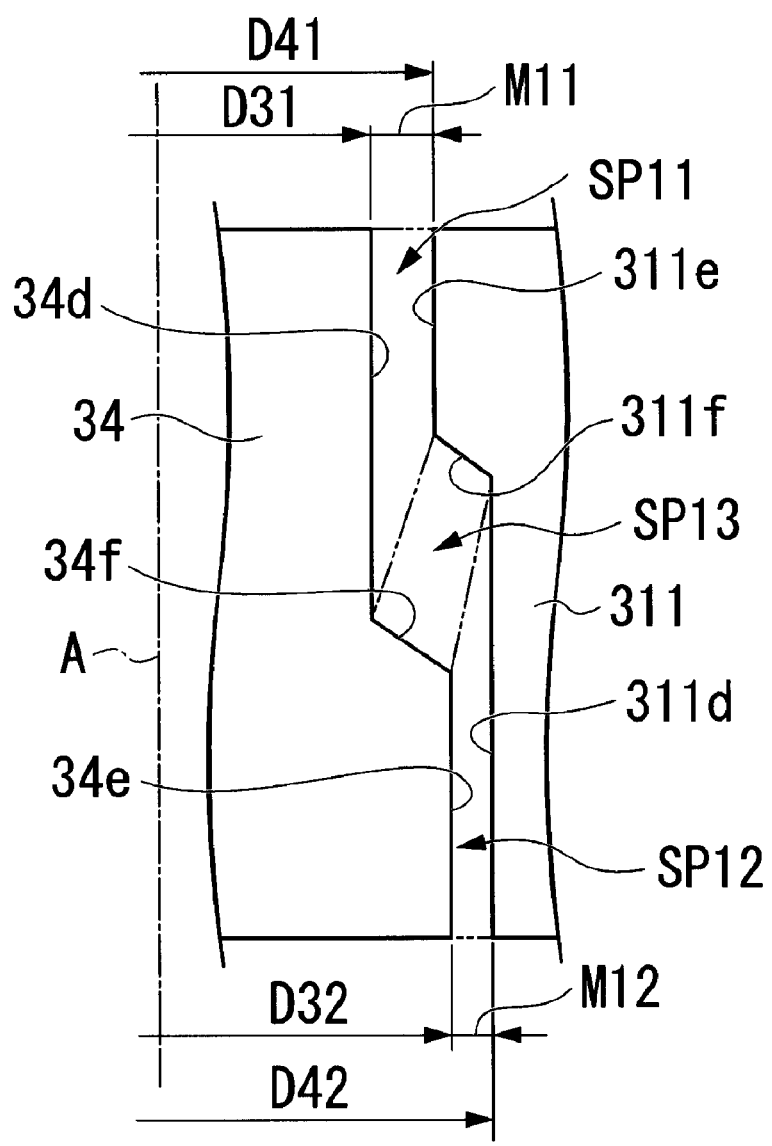
FIG. 9 is a diagram illustrating a spindle motor 1 according to a third modification of the above preferred embodiment of the present invention.

FIG. 9 is a schematic cross-sectional view illustrating a bearing portion 34 and a holder portion 311 of a spindle motor 1 according to a third modification of the above-described preferred embodiment. In FIG. 9, members or portions that have their equivalents in the second modification illustrated in FIG. 8 are denoted by the same reference numerals as those of their equivalents in the second modification, and descriptions of those members or portions are omitted.

Referring to FIG. 9, a maximum diameter D32 of a second protruding surface 34e of the bearing portion 34 is greater than a minimum diameter D41 of a first protruding surface 311e of the holder portion 311. A second boundary surface 34f of the bearing portion 34 and a first boundary surface 311f of the holder portion 311 are arranged to overlap with each other when viewed in a direction parallel to a central axis A. The spindle motor 1 according to the third modification is otherwise identical in structure to the spindle motor 1 according to the above-described preferred embodiment, and descriptions of such identical features are omitted.

① In the spindle motor 1 according to the third modification, a gap width M12 of a second gap SP12 is relatively small. ② This allows an adhesive 36 arranged in a third gap SP13 to spread more effectively into the second gap SP12. ③ In addition, as described above, the first boundary surface 311f and the second boundary surface 34f overlap with each other when viewed in the direction parallel to the central axis A. ④ This allows the adhesive 36 arranged in the third gap SP13 to be effectively compressed to spread into a first gap SP11 and the second gap SP12 when the bearing portion 34 is inserted into the holder portion 311 in the direction parallel to the central axis A from below the holder portion 311. ⑤ In the third modification, the strength with which the bearing portion 34 and the holder portion 311 are adhered to each other is thus improved.

Figure 10:
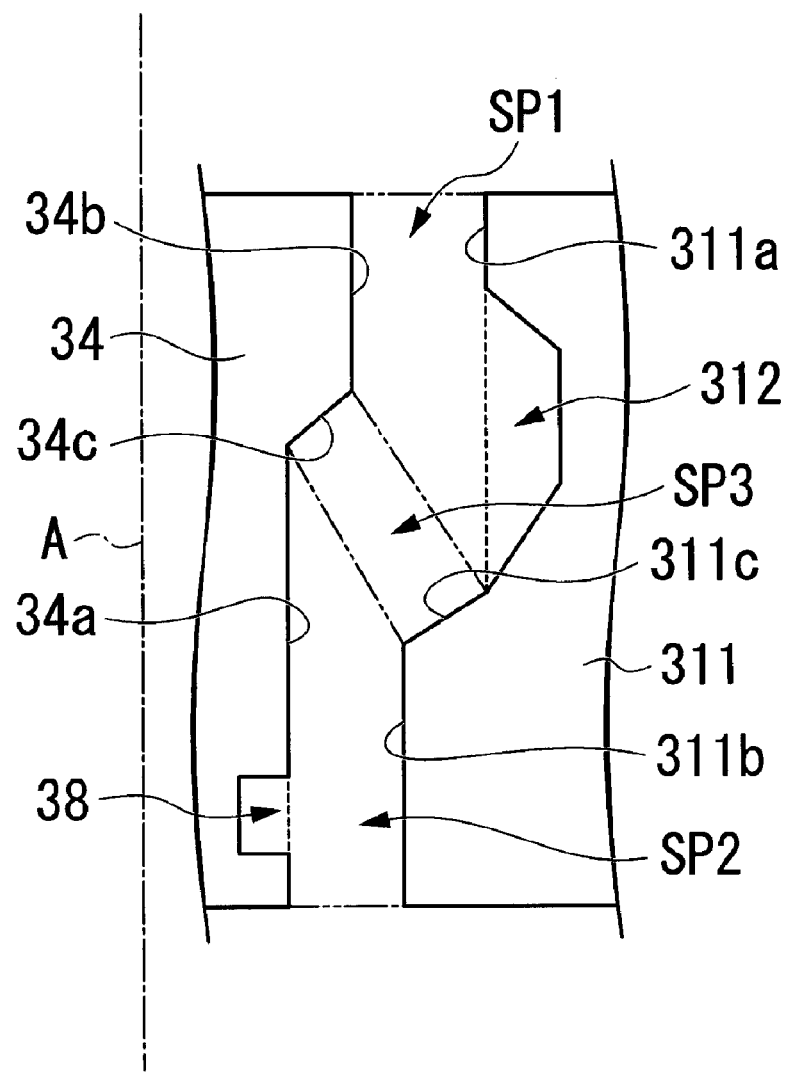
FIG. 10 is a diagram illustrating a spindle motor 1 according to a fourth modification of the above preferred embodiment of the present invention.
Figure 11:
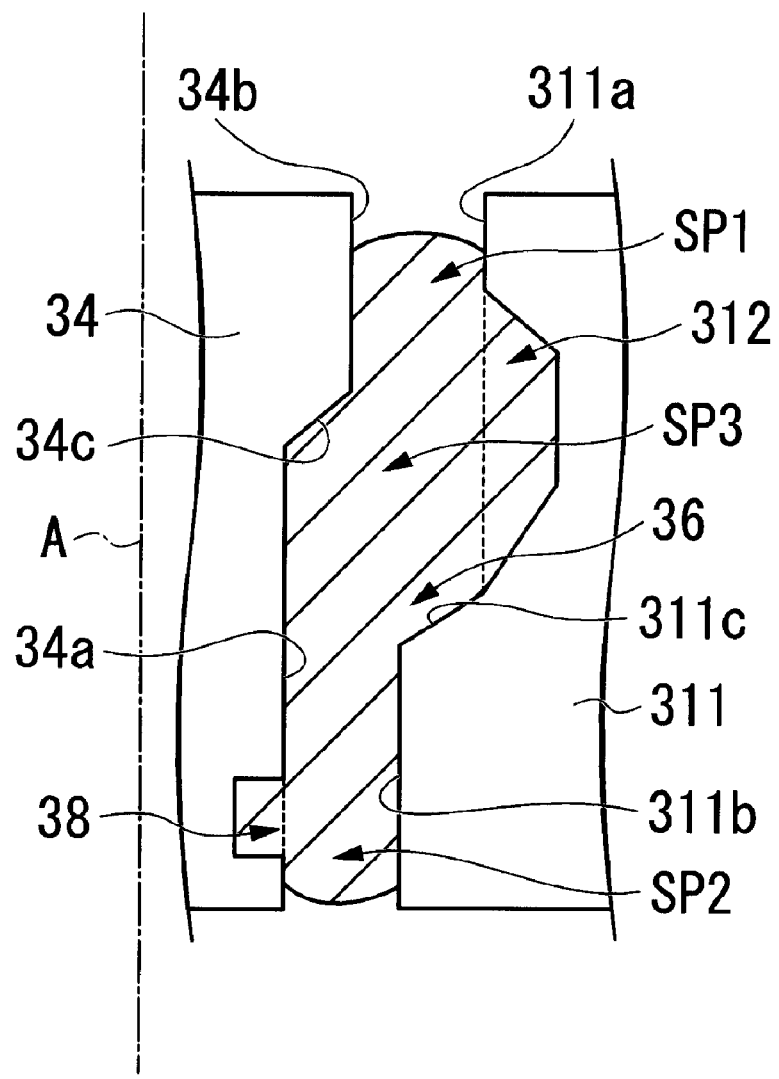
FIG. 11 is a diagram illustrating the spindle motor 1 according to the fourth modification of the above preferred embodiment of the present invention.

FIGS. 10 and 11 are each a schematic cross-sectional view illustrating a bearing portion 34 and a holder portion 311 of a spindle motor 1 according to a fourth modification of the above-described preferred embodiment. In FIG. 10, members or portions that have their equivalents in the above-described preferred embodiment illustrated in FIGS. 1 to 6 are denoted by the same reference numerals as those of their equivalents in the above-described preferred embodiment, and descriptions of those members or portions are omitted.

Referring to FIG. 10, an inside surface 311a of the holder portion 311 includes a holder-side groove portion 312 which is recessed radially outward. Referring to FIG. 11, a portion of an adhesive 36 is held in the holder-side groove portion 312. An outside surface 34a of the bearing portion 34 includes a bearing-side groove portion 38 which is recessed radially inward. A portion of the adhesive 36 is held in the bearing-side groove portion 38. The spindle motor 1 according to the present modification is otherwise similar in structure to the spindle motor 1 according to the above-described preferred embodiment, and descriptions of such similar features are omitted.

In the spindle motor 1 according to the fourth modification, the adhesive 36 is held in the holder-side groove portion 312 and the bearing-side groove portion 38 as well as in a first gap SP1, a second gap SP2, and a third gap SP3. This contributes to preventing a leakage of the adhesive 36 out of a gap SP. Note that, although both the holder-side groove portion 312 and the bearing-side groove portion 38 are provided in the fourth modification, only one of the holder-side groove portion 312 and the bearing-side groove portion 38 may be provided in another preferred embodiment of the present invention.

Figure 12:
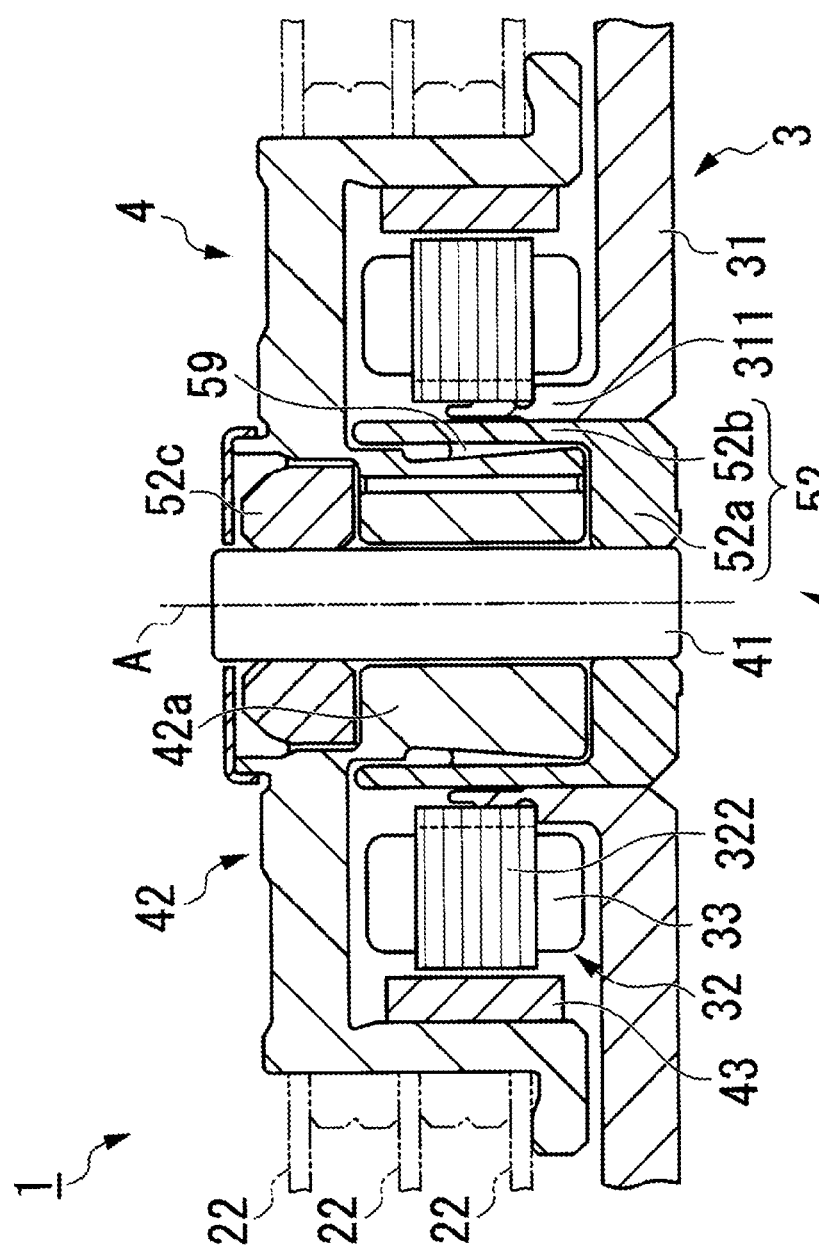
FIG. 12 is a diagram illustrating a spindle motor 1 according to a fifth modification of the above preferred embodiment of the present invention.
Figure 13:
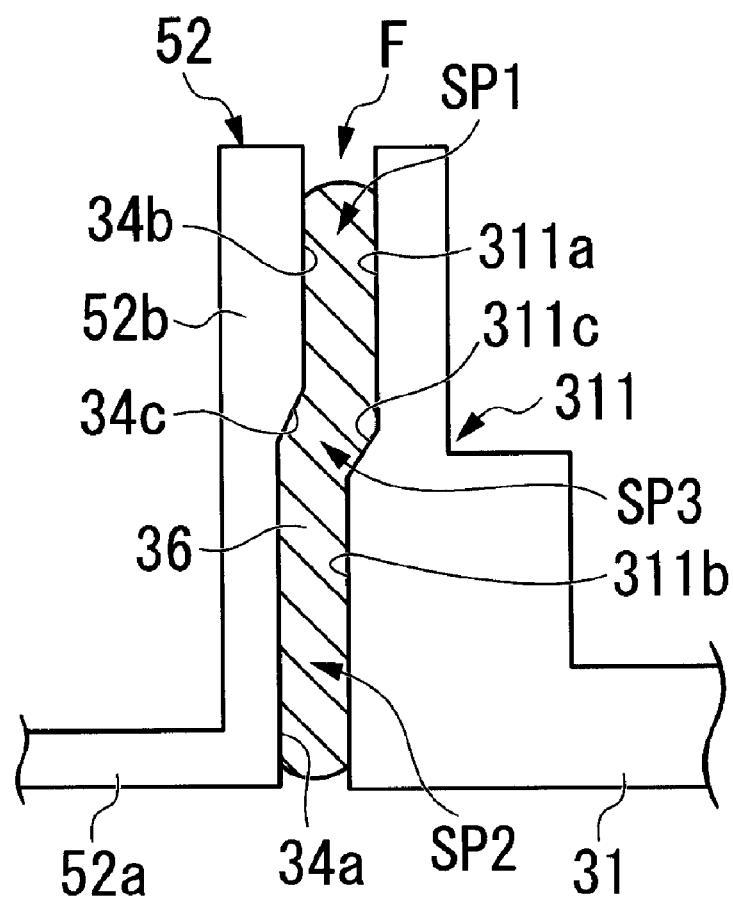
FIG. 13 is a diagram illustrating the spindle motor 1 according to the fifth modification of the above preferred embodiment of the present invention.

FIGS. 12 and 13 are each a diagram illustrating a spindle motor 1 according to a fifth modification of the above-described preferred embodiment. In FIGS. 12 and 13, members or portions that have their equivalents in the above-described preferred embodiment illustrated in FIGS. 1 to 6 are denoted by the same reference numerals as those of their equivalents in the above-described preferred embodiment, and descriptions of those members or portions are omitted.

FIG. 12 is a vertical cross-sectional view of the spindle motor 1 according to the fifth modification. FIG. 13 is a schematic diagram illustrating a fixing portion F through which a bearing portion 34 and a holder portion 311 are fixed to each other. The bearing portion 34 according to the fifth modification includes a shaft 41 and a cup portion 52. The cup portion 52 is in the shape of a cup, and includes a bottom portion 52a and a tubular portion 52b. The bottom portion 52a is arranged to extend radially outward from an outside surface of a lower portion of the shaft 41. The tubular portion 52b is arranged to extend upward from an outer edge portion of the bottom portion 52a. A lower end portion of the shaft 41 is press fitted to the bottom portion 52a, and is fixed to the bottom portion 52a through an adhesive. A thrust washer 52c is fixed to the shaft 41 at a position higher than the cup portion 52. The thrust washer 52c is substantially annular, is press fitted to the shaft 41, and is fixed to the shaft 41 through an adhesive.

A hub 42 includes a sleeve portion 42a. The sleeve portion 42a is substantially cylindrical, and includes an inner circumferential surface arranged opposite to an outer circumferential surface of the shaft 41. The sleeve portion 42a is arranged axially between the bottom portion 52a of the cup portion 52 and the thrust washer 52c. A lubricating oil 59 is arranged in a minute gap defined between the hub 42 and a combination of the cup portion 52, the shaft 41, and the thrust washer 52c. The hub 42 is supported to be rotatable with respect to the cup portion 52, the shaft 41, and the thrust washer 52c through the lubricating oil 59.

The cup portion 52 is inserted inside the holder portion 311 from above the holder portion 311, and is fixed to the holder portion 311 through an adhesive 36. The tubular portion 52b includes an outside surface 34a, a first protruding surface 34b, and a first boundary surface 34c. The first protruding surface 34b is annular, and is arranged to protrude radially outward from the outside surface 34a. The first boundary surface 34c is arranged below the first protruding surface 34b, and is arranged to join the outside surface 34a and the first protruding surface 34b to each other.

The holder portion 311 includes an inside surface 311a, a second protruding surface 311b, and a second boundary surface 311c. The second protruding surface 311b is annular, and is arranged to protrude radially inward from the inside surface 311a. The second boundary surface 311c is arranged above the second protruding surface 311b, and is arranged to join the inside surface 311a and the second protruding surface 311b to each other. The first boundary surface 34c is arranged above the second boundary surface 311c. The first protruding surface 34b is arranged radially opposite to the inside surface 311a with a first gap SP1 intervening therebetween. The second protruding surface 311b is arranged radially opposite to the outside surface 34a with a second gap SP2 intervening therebetween. The first boundary surface 34c is arranged opposite to the second boundary surface 311c with a third gap SP3 intervening therebetween.

In the spindle motor 1 according to the fifth modification, as in the spindle motor 1 according to the above-described preferred embodiment, the adhesive 36 spreads from the third gap SP3 to both the first gap SP1 and the second gap SP2 without being scraped off downward when the cup portion 52 is inserted inside the holder portion 311 from above the holder portion 311. As a result, a combination of the shaft 41 and the cup portion 52 is adhered to the holder portion 311. In addition, when the cup portion 52 is inserted inside the holder portion 311, an inclination of the cup portion 52 can be reduced.

Note that, although a combination of the outside surface, the inside surface, the first protruding surface, the second protruding surface, the first boundary surface, and the second boundary surface according to the above-described preferred embodiment is adopted in the fifth modification, in which the cup portion 52 is used, combinations of these surfaces according to the second to fourth modifications may be adopted in modifications of the fifth modification.

While preferred embodiments of the present invention have been described above, it will be understood that the present invention is not limited to the above-described preferred embodiments. The shapes of the constituent members, the combinations of the constituent members, and so on according to the above-described preferred embodiments are merely illustrative examples, and various modifications can be devised in accordance with design requirements or the like without departing from the scope of the present invention.

For example, in each of the above-described preferred embodiment and the modifications thereof, the radial gap SP defined between the bearing portion 34 and the holder portion 311 is annular and extends all the way around the bearing portion 34 in the circumferential direction. Note, however, that, when the bearing portion 34 and the holder portion 311 are combined together, the bearing portion 34 and the holder portion 311 may make local contact with each other, with a gap being defined between the bearing portion 34 and the holder portion 311 at another area.

Note that each of the first and second boundary surfaces described above may either be a single surface or include a plurality of surfaces. Each of the first and second boundary surfaces may either be a continuous surface or include discontinuous surfaces. Also note that only a portion of the first boundary surface may be arranged above the second boundary surface. The entire first boundary surface may be arranged above the second boundary surface.

Features of the above-described preferred embodiments and the modifications thereof may be combined appropriately as long as no conflict arises.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A spindle motor comprising:
   a rotor portion including a rotor magnet;
   a bearing portion arranged to support the rotor portion such that the rotor portion is rotatable about a central axis extending in a vertical direction of the rotor portion;
   a stator portion arranged opposite to the rotor magnet;
   a base portion including a tubular holder portion arranged to hold the bearing portion inside thereof; and
   a fixing portion defined by the bearing portion, the holder portion, a gap between the bearing portion and the holder portion, and an adhesive arranged in the gap; wherein
   the gap is arranged to extend in an annular shape in a circumferential direction;
   the fixing portion includes:
      an annular first protruding surface arranged to protrude radially from a first one of an outside surface of the bearing portion and an inside surface of the holder portion, and an annular second protruding surface arranged to protrude radially from a second one of the outside surface of the bearing portion and the inside surface of the holder portion;
      a first boundary surface arranged below the first protruding surface, and arranged to join the first surface and the first protruding surface to each other; and
      a second boundary surface arranged above the second protruding surface, and arranged to join the second surface and the second protruding surface to each other;
   at least a portion of the first boundary surface is arranged above the second boundary surface;
   the first protruding surface is arranged radially opposite to the second surface with a first gap intervening therebetween;
   the second protruding surface is arranged radially opposite to the first surface with a second gap intervening therebetween;
   the first boundary surface is arranged opposite to the second boundary surface with a third gap intervening therebetween; and
   the adhesive is arranged to extend from the third gap to both at least a portion of the first gap and at least a portion of the second gap.

2. The spindle motor according to claim 1, wherein the adhesive is arranged in each of the first gap, the second gap, and the third gap.

3. The spindle motor according to claim 1, wherein the first gap is arranged to have a gap width greater than a gap width of the second gap.

4. The spindle motor according to claim 1, wherein
   a lower surface of the adhesive is located at a lower opening of the second gap; and
   an upper surface of the adhesive is located in the first gap.

5. The spindle motor according to claim 1, wherein
   the bearing portion includes the first protruding surface; and
   the first protruding surface is arranged to have a maximum diameter smaller than a minimum diameter of the second protruding surface.

6. The spindle motor according to claim 1, wherein
   the bearing portion includes the first protruding surface; and
   the first protruding surface is arranged to have a maximum diameter greater than a minimum diameter of the second protruding surface.

7. The spindle motor according to claim 6, wherein the first boundary surface and the second boundary surface are arranged to overlap with each other when viewed in a direction parallel to the central axis.

8. The spindle motor according to claim 1, wherein
   the holder portion includes the first protruding surface; and
   the first protruding surface is arranged to have a minimum diameter greater than a maximum diameter of the second protruding surface.

9. The spindle motor according to claim 1, wherein
   the holder portion includes the first protruding surface; and
   the first protruding surface is arranged to have a minimum diameter smaller than a maximum diameter of the second protruding surface.

10. The spindle motor according to claim 9, wherein the first boundary surface and the second boundary surface are arranged to overlap with each other when viewed in a direction parallel to the central axis.

11. The spindle motor according to claim 1, wherein
the inside surface of the holder portion includes a holder-side groove portion recessed radially outward; and
a portion of the adhesive is held in the holder-side groove portion.

12. The spindle motor according to claim 1, wherein
the outside surface of the bearing portion includes a bearing-side groove portion recessed radially inward; and
a portion of the adhesive is held in the bearing-side groove portion.

13. The spindle motor according to claim 1, wherein
the bearing portion includes:
 a shaft arranged to extend in an axial direction; and
 a cup portion including a bottom portion arranged to extend radially outward from an outside surface of a lower portion of the shaft, and a tubular portion arranged to extend upward from the bottom portion; and
the outside surface of the bearing portion is an outside surface of the tubular portion.

14. A disk drive apparatus comprising:
the spindle motor of claim 1;
a disk supported by the spindle motor; and
an access portion arranged to perform at least one of reading and writing of information from or to the disk.

15. The spindle motor according to claim 1, wherein
the adhesive is continuously provided in each of the first gap, the second gap, and the third gap.

16. The spindle motor according to claim 1, wherein
the annular first protruding surface protrudes radially from the outside surface of the bearing portion and the annular second protruding surface protrudes radially from the inside surface of the holder portion.

* * * * *